US012416278B2

(12) United States Patent
Servatius et al.

(10) Patent No.: US 12,416,278 B2
(45) Date of Patent: Sep. 16, 2025

(54) MIXTURE FORMATION APPARATUS, METHOD OF MANUFACTURING A MIXTURE FORMATION APPARATUS AND WORKING DEVICE OR INTERNAL COMBUSTION ENGINE

(71) Applicant: Andreas Stihl AG & Co. KG, Waiblingen (DE)

(72) Inventors: Felix Servatius, Remshalden (DE); Alexandre Caon Biondo, Porto Alegre (BR); Paula Rodrigues Caumo, Sao Leopoldo (BR); Sofia Fogaca Soubhia, Porto Alegre (BR); Takashi Ishii, Iwate-Ken (JP); Vital Kumar Yadav Pillala, Iwate-Ken (JP)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 18/804,694

(22) Filed: Aug. 14, 2024

(65) Prior Publication Data

US 2025/0059936 A1 Feb. 20, 2025

(30) Foreign Application Priority Data

Aug. 15, 2023 (DE) ..................... 10 2023 121 790.9

(51) Int. Cl.
*F02M 19/06* (2006.01)
*F02M 35/10* (2006.01)

(52) U.S. Cl.
CPC ...... *F02M 19/06* (2013.01); *F02M 35/10314* (2013.01); *F02M 2700/05* (2013.01)

(58) Field of Classification Search
CPC ......... F02M 2700/05; F02M 35/10315; F02M 19/06
See application file for complete search history.

(56) References Cited

U.S. PATENT DOCUMENTS

| | | | | | |
|---|---|---|---|---|---|
| 3,918,422 | A * | 11/1975 | Kargilis | F02M 31/0825 123/184.41 |
| 5,321,386 | A * | 6/1994 | Ishiguro | G01F 1/684 338/270 |
| 2002/0164909 | A1 | 11/2002 | Matsuda et al. | |
| 2007/0107701 | A1 * | 5/2007 | Buelow | F02M 35/024 123/519 |

FOREIGN PATENT DOCUMENTS

| | | | | | |
|---|---|---|---|---|---|
| DE | 10 2019 101 449 | A1 | 7/2020 | |
| DE | 10 2021 133 647 | A1 | 6/2023 | |
| JP | 55-165410 | A | 12/1980 | |
| JP | 59-150958 | A | 8/1984 | |
| JP | H08261060 | A * | 10/1996 | |
| JP | 2010-71491 | A | 4/2010 | |
| WO | WO-2020078832 | A1 * | 4/2020 | B23K 26/0093 |

* cited by examiner

*Primary Examiner* — Kevin A Lathers
(74) *Attorney, Agent, or Firm* — Crowell & Moring LLP

(57) ABSTRACT

A mixture formation apparatus, especially for an internal combustion engine of a working device, has a mixture formation apparatus housing, where a surface of the mixture formation apparatus housing is provided at least partly with a layer structure for protection from corrosion and/or deposits. The layer structure has at least one aluminium oxide layer having a layer thickness of at least 10 μm. A method of manufacturing the mixture formation apparatus, and a working device or an internal combustion engine having the mixture formation apparatus, are disclosed.

20 Claims, 3 Drawing Sheets

MIXTURE FORMATION APPARATUS, METHOD OF MANUFACTURING A MIXTURE FORMATION APPARATUS AND WORKING DEVICE OR INTERNAL COMBUSTION ENGINE

CROSS REFERENCE TO RELATED APPLICATION

This application claims priority under 35 U.S.C. § 119 from German Patent Application No. 10 2023 121790.9, filed Aug. 15, 2023, the entire disclosure of which is herein expressly incorporated by reference.

BACKGROUND AND SUMMARY

The invention relates to a mixture formation apparatus, especially for an internal combustion engine of a working device, to a method of manufacturing a mixture formation apparatus, and to a working device or internal combustion engine having a mixture formation apparatus.

The problem addressed by the invention is that of providing a mixture formation apparatus, a method of manufacturing a mixture formation apparatus and a working device or internal combustion engine having a mixture formation apparatus, especially wherein the mixture formation apparatus, the method and the working device or internal combustion engine have improved properties, especially in each case.

This problem is solved by the provision of a mixture formation apparatus, by a method of manufacturing a mixture formation apparatus, and by a working device or internal combustion engine having the mixture formation apparatus, in accordance with the independent claim(s). Advantageous embodiments of the invention are described in the dependent claims. The wording of all claims is hereby incorporated into the description by explicit reference.

In a first aspect, the invention relates to a mixture formation apparatus, especially for an internal combustion engine of a working device. The working device may be in the form of a hand-guided, hand-held or motor-driven working device. Further, the working device may be in the form of a processing or working robot, in particular an outdoor and/or autonomous mobile processing or working robot. For example, the working device may be a motor saw, a cutting grinder, a brush cutter, a hedge shears, a blower, a lawn mower or the like.

The mixture formation apparatus has a mixture formation apparatus housing.

In the context of the present invention, the mixture formation apparatus may also be referred to as a "mixture formation unit", and the mixture formation apparatus housing correspondingly also as a "mixture formation unit housing".

A surface of the mixture formation apparatus housing is or has been provided at least partly, especially only partly, or completely, i.e. throughout or over the full area, with a layer structure for protection from corrosion and/or deposits, especially organic and/or polymeric deposits, or comprises at least partly, especially only partly, or completely, i.e. throughout or over the full area, a layer structure for protection from corrosion and/or deposits, especially organic and/or polymeric deposits.

The mixture formation apparatus housing preferably includes aluminium or an aluminium alloy. The mixture formation apparatus housing especially preferably consists of aluminium or an aluminium alloy.

In the context of the present invention, the expression "mixture formation apparatus" shall be considered to mean an apparatus set up to form a mixture of fluids, especially an air-fuel mixture, i.e. a mixture including or consisting of air and fuel, or of enabling the formation of such a mixture, especially for subsequent combustion of the mixture.

The expression "layer structure for protection from corrosion and/or deposits" is abbreviated hereinafter to "layer structure".

Moreover, the layer structure in the context of the present invention may also be referred to as coating.

The layer structure has at least one aluminium oxide layer having a layer thickness of at least 10 μm.

Moreover, the layer structure preferably takes the form of a multilayer structure.

Moreover, the at least one aluminium oxide layer may especially be only one aluminium oxide layer or a multitude of aluminium oxide layers, i.e. two or more aluminium oxide layers.

The invention can advantageously reduce or even completely avoid corrosion of surfaces of a mixture formation apparatus housing, for example a carburetor housing.

Moreover, it is advantageous that the invention can reduce or even completely avoid deposits of nonvolatile organic compounds in particular, preferably polymer resins, on surfaces of mixture formation apparatus housings. Such compounds or polymer resins may themselves already be dissolved in fuels or may be formed via polymerization and oxidation in the course of storage of fuels or in the course of evaporation of fuels in the presence of air. If the deposits are deposited at/within constricted sites, for example at/within nozzles and/or, for example, constricted sites defined by a screw tip and an inner surface of the mixture formation apparatus housing, and/or within ducts of a mixture formation apparatus, this will disrupt fuel flow, which means that the apparatus has to be made ready for use by cleaning or in the worst case will no longer run. Thus, the present invention also makes a valuable contribution to extending the lifetime of a mixture formation apparatus.

In particular, the invention also enables longer storage times of fuels in the mixture formation apparatus or the working device without this resulting in serious impairments as a result of corrosion and/or deposits.

Surprisingly, moreover, a minimum layer thickness of the at least one aluminium oxide layer of at least 10 μm has been found to be particularly advantageous with regard to the formation of a continuous, i.e. uninterrupted, aluminium oxide layer and especially layer structure on the surface or part of the surface of the mixture formation apparatus housing.

In one embodiment of the invention, the at least one aluminium oxide layer has a constant, i.e. non-varying, layer thickness. As a result, planned process control for manufacture of the mixture formation apparatus is advantageously achievable. In particular, no subsequent processing step is required for creation of a uniform layer thickness of the at least one aluminium oxide layer. Such a processing step is afflicted with the risk in principle that the at least one aluminium oxide layer will be removed again at least in regions, which increases the propensity to corrosion.

As an alternative, the at least one aluminium oxide layer may have a varying, i.e. nonconstant, layer thickness.

In a further embodiment, the at least one aluminium oxide layer has a layer thickness of 10 μm to 40 μm, especially 10 μm to 25 μm, especially 10 μm to 20 μm. The layer thicknesses disclosed in this paragraph especially have the (further) advantage that the advantages of the invention are fully manifested without this resulting in any impairment of the ability of the mixture formation apparatus to work. In particular, prior to providing the surface of the mixture formation apparatus housing with the multilayer structure, holes such as drill holes, especially calibration holes, merely have to be made minimally larger in order to achieve a defined target value for an internal diameter of the holes.

In a further embodiment of the invention, the at least one aluminium oxide layer is formed or arranged, in particular directly or indirectly, on the surface of the mixture formation apparatus housing. Here, the at least one aluminium oxide layer may be formed, in particular directly or indirectly, on a natural aluminium oxide layer formed directly on the surface of the mixture formation apparatus housing. The expression "natural aluminium oxide layer" in the context the present invention shall be considered to mean an aluminium oxide layer which forms on aluminium or an aluminium alloy on contact with oxygen under normal ambient conditions, and protects the aluminium or aluminium alloy against further oxidation. The natural aluminium oxide layer may have a layer thickness of 5 nm to 20 nm. Alternatively, the at least one aluminium oxide layer may be formed, in particular directly or indirectly, on the surface of the mixture formation apparatus housing, where the surface of the mixture formation apparatus housing is free of any natural aluminium oxide layer.

In a further embodiment of the invention, the layer structure also has at least one pore-sealing layer. The at least one pore-sealing layer can advantageously seal pores in the at least one aluminium oxide layer, which, under some circumstances, extend down to the underlying surface of the mixture formation apparatus housing. As a result, it is advantageously possible to additionally improve the corrosion resistance of the mixture formation apparatus. Moreover, this embodiment of the invention can improve the surface roughness of the mixture formation apparatus housing, which is of relevance, for example, for sealing surfaces.

The at least one pore-sealing layer may especially be only one pore-sealing layer or a multitude of pore-sealing layers, i.e. two or more pore-sealing layers.

The at least one pore-sealing layer is especially selected from the group consisting of at least one nickel acetate layer, at least one aluminium hydroxide layer, and a combination of at least one nickel acetate layer and at least one aluminium hydroxide layer.

The at least one nickel acetate layer may especially be only one nickel acetate layer or a multitude of nickel acetate layers, i.e. two or more nickel acetate layers.

The at least one aluminium hydroxide layer may especially be only one aluminium hydroxide layer or a multitude of aluminium hydroxide layers, i.e. two or more aluminium hydroxide layers.

In a further embodiment of the invention, the at least one pore-sealing layer has a layer thickness of ≤5 μm, especially ≤5 μm to >0 μm, especially 1 μm to 4 μm, preferably 1.5 μm to 2.5 μm.

In a further embodiment of the invention, the at least one pore-sealing layer is formed or arranged on the at least one aluminium oxide layer, in particular directly or indirectly.

In a further embodiment of the invention, the at least one pore-sealing layer is in the form of at least one layer that concludes the layer structure on the outside or separates the layer structure from the outside, i.e. toward or from an environment of the mixture formation apparatus.

In a further embodiment of the invention, the surface of the mixture formation apparatus housing is an outer surface and/or inner surface of the mixture formation apparatus housing. In particular, the surface of the mixture formation apparatus housing may be only one outer surface or only one inner surface of the mixture formation apparatus housing.

In a further embodiment of the invention, the surface of the mixture formation apparatus housing has an inner surface that bounds or limits a hollow volume or cavity of the mixture formation apparatus housing in regions, especially solely in regions. In particular, the surface of the mixture formation apparatus housing may be an inner surface that bounds or limits a hollow volume or cavity of the mixture formation apparatus housing in regions, especially solely in regions.

The surface of the mixture formation apparatus housing preferably has a multitude of, i.e. two or more, inner surfaces that each bound or limit a hollow volume or cavity of the mixture formation apparatus housing in regions, especially solely in regions. In particular, the surface of the mixture formation apparatus housing may comprise several internal surfaces that each bound or limit a hollow volume or cavity of the mixture formation apparatus housing in regions, especially solely in regions.

In a further embodiment of the invention, the hollow volume or cavity of the mixture formation apparatus housing is a hollow volume or cavity of a duct, especially fluid-conducting duct, of the mixture formation apparatus housing. In the context of the present invention, the expression "fluid-conducting duct" shall be considered to mean a duct that is formed or runs within the mixture formation apparatus housing and is for conducting or conveying of fluids, preferably of a fuel and/or of air. The duct may especially be selected from the group consisting of intake duct, mixture duct, air feed duct, fuel feed duct, and combinations of at least two of the aforementioned ducts.

The expression "intake duct" in the context of the present invention shall be considered to mean a duct that is formed or runs within the mixture formation apparatus housing and is designed to conduct or convey air sucked in for combustion of a fuel.

The expression "mixture duct" in the context of the present invention shall be considered to mean a duct that is formed or runs within the mixture formation apparatus housing and opens into an internal combustion engine and is designed to conduct or to convey a mixture including or consisting of air and fuel, also referred to hereinafter as air-fuel mixture.

The expression "air feed duct" in the context of the present invention shall be considered to mean a duct that is formed or runs within the mixture formation apparatus housing and is designed to conduct or convey air for combustion of a fuel, especially wherein the air conducted or conveyed by the air duct is fuel-free or has a lower proportion of fuel than the fuel-air mixture conducted or conveyed through the mixture duct.

The expression "fuel feed duct" in the context of the present invention shall be considered to mean a duct that is formed or runs within the mixture formation apparatus housing and is designed to conduct or convey fuel.

In a further embodiment of the invention, the hollow volume or cavity of the mixture formation apparatus housing is a hollow volume or cavity of a chamber, especially a control chamber and/or compensation chamber, of the mixture formation apparatus housing.

The expression "control chamber" in the context of the present invention shall be considered to mean a membrane-bounded chamber of a membrane carburetor.

The expression "compensation chamber" in the context of the present invention shall be considered to mean a chamber of a carburetor that has a compensation connection, and is especially connected to a control pressure source via a control pressure conduit, especially in the form of a hose or tube. The compensation connection can connect the compensation chamber of the carburetor, for example, to a clean space of an air filter of a working device.

In a further embodiment of the invention, the surface of the mixture formation apparatus housing has a surface of an inner wall and/or of a base or bottom of at least one depression, especially of only one depression or two or more depressions, in the mixture formation apparatus housing and/or a surface of an inner wall of at least one opening or breakthrough, especially only one opening or breakthrough or two or more openings or breakthroughs, in the mixture formation apparatus housing. In particular, the surface of the mixture formation apparatus housing may be a surface of an inner wall and/or of a base or bottom of at least one depression, especially only one depression or two or more depressions, in the mixture formation apparatus housing and/or a surface of an inner wall of at least one opening or breakthrough, especially only one opening or breakthrough or two or more openings or breakthroughs, in the mixture formation apparatus housing. The at least one opening or breakthrough may especially be configured as at least one opening or breakthrough in duct form, especially only one opening or breakthrough in duct form or two or more openings or breakthroughs in duct form.

In a further embodiment of the invention, the at least one depression takes the form of at least one hole, in particular at least one drill hole, especially of only one hole, in particular only one drill hole, or two or more holes, in particular two or more drill holes, and/or the at least one opening takes the form of at least one hole, in particular at least one drill hole, especially of only one hole, in particular only one drill hole, or two or more holes, in particular two or more drill holes.

The mixture formation apparatus is preferably a carburetor, and the mixture formation apparatus housing a carburetor housing. The carburetor may fundamentally be configured as a throttle flap carburetor or as a drum carburetor. In particular, the carburetor may be a carburetor having an electromagnetic valve, especially for fuel control. The carburetor is preferably a membrane carburetor or float carburetor.

Alternatively, the mixture formation apparatus may be an injection system, especially a low-pressure injection, i.e. an injection system that conveys the fuel under a pressure of 80 mbar to 150 mbar.

It is further preferable that in particular all non-aluminium-containing or non-aluminium alloy-containing components, especially non-aluminium-containing or non-aluminium alloy-containing insert parts, of the mixture formation apparatus, for example intake control needle, screws, nozzles, pumps, purgers, primers, rubber components such as control membrane and/or valves, are not provided with the layer structure.

Especially preferably, solely the mixture formation apparatus housing of the mixture formation apparatus may be provided with the layer structure. In other words, it may be especially preferable that the mixture formation apparatus, apart from non-aluminium-containing or non-aluminium alloy-containing components, especially non-aluminium-containing or non-aluminium alloy-containing insert parts, for example screws, nozzles, pumps and/or valves, is or has been provided with the layer structure or comprises the layer structure.

In a second aspect, the invention relates to a mixture formation apparatus, especially for an internal combustion engine of a working device, having a mixture formation apparatus housing, where a surface of the mixture formation apparatus housing is or has been provided at least partly, especially only partly, or completely, i.e. throughout or over the full area, with a layer structure for protection from corrosion and/or deposits, where the layer structure has at least one zinc layer and at least one nickel layer or comprises at least partly, especially only partly, or completely, i.e. throughout or over the full area, a layer structure for protection from corrosion and/or deposits, where the layer structure has at least one zinc layer and at least one nickel layer.

The at least one zinc layer may especially be only one zinc layer or a multitude of zinc layers, i.e. two or more zinc layers.

The at least one nickel layer may especially be only one nickel layer or a multitude of nickel layers, i.e. two or more nickel layers.

The at least one zinc layer and/or the at least one nickel layer may, especially respectively, have a constant or varying layer thickness.

The at least one nickel layer is preferably formed on the at least one zinc layer, in particular directly or indirectly. The at least one zinc layer preferably serves as primer or adhesion promoter for the at least one nickel layer.

Moreover, the at least one zinc layer may be formed, in particular directly or indirectly, on the surface of the mixture formation apparatus housing, in particular on a natural aluminium oxide layer formed on the surface of the mixture formation apparatus housing, or, in particular directly or indirectly, on the surface of the mixture formation apparatus housing which is free of any natural aluminium oxide layer.

Moreover, the layer structure may also have at least one pore-sealing layer. The at least one pore-sealing layer is preferably formed on the at least one nickel layer, in particular directly or indirectly. Moreover, the at least one nickel layer may be at least one chemical nickel layer. The expression "chemical nickel layer" in the context of the present invention shall be considered to mean a coating of nickel that has been created chemically, i.e. by means of a redox reaction, in particular and a further alloy partner, for example phosphorus or boron. In particular, the at least one chemical nickel layer may have a phosphorus content of 1% by weight to >10% by weight, especially 1% by weight to 14% by weight, preferably 1% by weight to 4% by weight, 5% by weight to 9% by weight or 10% by weight to 14% by weight, based on the total weight of the at least one chemical nickel layer. A chemical nickel layer having a phosphorus content of 1% by weight to 4% by weight, based on the total weight of the chemical nickel layer, may also be referred to in the context of the present invention as a low-phosphorus chemical nickel layer. A chemical nickel layer having a phosphorus content of 5% by weight to 9% by weight may also be referred to in the context of the present invention as a medium-phosphorus chemical nickel layer. A chemical nickel layer having a phosphorus content of 10% by weight to 14% by weight may also be referred to in the context of the present invention as a high-phosphorus chemical nickel layer. Alternatively, the at least one nickel layer may be at least one galvanic nickel layer. The expression "galvanic nickel layer" in the context of the present invention shall be considered to mean a coating of pure nickel that is deposited with the aid of electrical current.

With regard to further features and advantages of the mixture formation apparatus, reference is made completely to the features and advantages described in the first aspect of the invention, which are applicable mutatis mutandis.

In a third aspect, the invention relates to a method of manufacturing a mixture formation apparatus, especially according to the first aspect of the invention. The method has the following steps in chronological sequence:

a) degreasing and/or pickling a surface of a mixture formation apparatus housing, b) at least partly, especially only partly, or completely, i.e. throughout or over the full area, providing the surface of the mixture formation apparatus housing with at least one aluminium oxide layer, where the at least one aluminium oxide layer has a layer thickness of at least 10 μm.

Step b) may be conducted immediately or not immediately after step a).

The degreasing in step a) can be conducted with the aid of an organic, especially halogenated, solvent, especially selected from the group consisting of hydrochlorocarbons, hydrofluorocarbons and mixtures thereof, and/or with the aid of an aqueous solution. For environmental reasons, it is preferable to use an aqueous solution as degreasing agent.

The pickling in step a) can especially be conducted with the aid of an alkaline solution, for example sodium hydroxide solution, and/or with the aid of acids, especially inorganic acids, for example concentrated sulfuric acid, nitric acid, hydrofluoric acid or mixtures thereof. For example, the pickling in step a) can be conducted with the aid of a mixture of sulfuric acid, sodium dichromate and water, especially with a mixture of 27.5% by weight of concentrated sulfuric acid, 7.5% by weight of sodium dichromate ($Na_2Cr_2O_7 \times 2H_2O$) and 65% by weight of water (weight figures based in each case on the total weight of the mixture), or with the aid of a mixture of nitric acid and hydrofluoric acid.

In a further embodiment of the invention, step b) is conducted by anodizing, preferably eloxing.

The expression "anodizing" in the context of the present invention shall be considered to mean an electrolytic method of producing or thickening oxidic layers on metals or metal alloys, especially aluminium or aluminium alloy. Anodizing serves in particular to protect metals from corrosion.

The expression "eloxal method" or "eloxing" in the context of the present invention shall be considered to mean a method of creating an oxidic protective layer on aluminium or an aluminium alloy by anodic oxidation. By contrast with galvanic coating methods, eloxing does not involve precipitation of the protective layer on a workpiece; instead, an oxide is formed by conversion of the uppermost metal layer or metal alloy layer.

Step b) is preferably conducted by means of DC current. Alternatively, step b) can be conducted with AC current or with the aid of a combination of the two types of current, i.e. DC current and AC current. In the DC current variant, the mixture formation apparatus housing is connected as the anode. The counter electrode used is a material which is not attacked by an electrolyte (used to conduct step b)).

Step b) can be conducted as a dipping method in an oxidation bath at rest. In that case, the mixture formation apparatus housing is dipped wholly or partly into an oxidation bath. In this variant, a power source is secured to the mixture formation apparatus housing and to a counter electrode immersed in the oxidation bath.

Alternatively, step b) may be conducted as a spraying method. In that case, the mixture formation apparatus housing and a movable nozzle from which an electrolyte exits are connected to a power source.

Further in the alternative, step b) may be conducted as a continuous process in an oxidation bath at rest. In that case, the mixture formation apparatus housing is pulled through the oxidation bath, and a power source is secured to the mixture formation apparatus housing and to a counter electrode immersed in the oxidation bath.

Moreover, step b) can be conducted at a voltage of 5 V to 40 V.

Moreover, step b) can be conducted over a period of 20 min to 120 min, especially 30 min to 90 min.

Moreover, step b) can be conducted with an electrolyte which is especially selected from the group consisting of sulfuric acid, oxalic acid, and mixtures of at least two of the aforementioned electrolytes.

In particular, step b) can be conducted with a solution, especially an aqueous solution, containing the electrolyte, especially where the electrolyte has a concentration of 150 g/l to 250 g/l, especially 190 g/l to 220 g/l, based on the total weight of the solution.

Moreover, the method may also have a step a'b) that takes place between steps a) and b):

a'b) removing a natural aluminium oxide layer from the surface of the mixture formation apparatus housing. This can advantageously achieve a better coating quality, especially in that this can lower the risk of subsequent occurrence of cracks. Moreover, the natural aluminium oxide layer forms an insulation, which would impair the performance of step b). Thus, step a'b) has the further advantage that it prepares the surface of the mixture formation apparatus housing for the performance of step b).

Step a'b) may especially be conducted by neutralizing the surface of the mixture formation apparatus housing by treatment with an acid, especially inorganic acid, for example sulfuric acid.

Step a'b) may be conducted immediately or not immediately after step a) and/or immediately or not immediately before step b).

Moreover, the method may also have, between steps a) and b), especially between steps a'b) and b), a step ab):

ab) polishing, especially chemically polishing or chemomechanically polishing, the surface of the mixture formation apparatus housing. This can advantageously achieve a homogeneous surface structure of the at least one aluminium oxide layer.

Step ab) can be conducted immediately or not immediately after step a), especially after step a'b), and/or immediately or not immediately before step b).

In a further embodiment of the invention, the method also has, especially immediately or not immediately, after step b), a step c):

c) treating the surface of the mixture formation apparatus housing with a pore-sealing material, especially nickel acetate and/or water, especially water vapour, to form at least one pore-sealing layer.

In the case of treatment of the surface of the mixture formation apparatus housing with nickel acetate, step c) can be conducted at a temperature of 80° C. to 100° C., especially 85° C. to 95° C., and/or over a period of 5 min to 30 min, especially 10 min to 20 min.

In the case of treatment of the surface of the mixture formation apparatus housing with water, especially water vapour, step c) can be conducted at a temperature of 80° C. to 100° C., especially 85° C. to 95° C., and/or over a period of 5 min to 30 min, especially 10 min to 20 min.

In a further embodiment of the invention, step b) is conducted only once, i.e. not repeatedly. This is an embodiment of the invention which is particularly advantageous for reasons of cost and time.

The method also preferably has a step d):

d) inserting components, especially insert parts, into the mixture formation apparatus housing. The components may be selected, for example, from the group consisting of fuel feeds, air feeds, control and/or throttle elements for combustion air, control and/or throttle elements for fuel, closed-loop control elements for the supply of fuel, cold-start elements, idling device, intake air preheating device, accelerator pump, part-load flaps, full-load flaps, compensator, purger, primer, starter flap, throttle flap, choke flap, adjuster screws, valve needle and combinations of at least two of the aforementioned components.

The components, especially insert parts, may especially be non-aluminium-containing or non-aluminium alloy-containing components, especially non-aluminium-containing or non-aluminium alloy-containing insert parts.

With regard to further features and advantages of the method, reference is made completely to the features and advantages described in the first aspect of the invention, which are applicable mutatis mutandis.

In a fourth aspect, the invention relates to a method of manufacturing a mixture formation apparatus, especially according to the second aspect of the invention. The method has the following steps in chronological sequence:

a) degreasing and/or pickling a surface of a mixture formation apparatus housing, b) at least partly, especially only partly, or completely, i.e. throughout or over the full area, providing the surface of the mixture formation apparatus housing with at least one zinc layer and at least one nickel layer.

Preferably, the surface of the mixture formation apparatus housing, in the performance of step b), is or has been provided first with the at least one zinc layer and then with the at least one nickel layer.

Moreover, the at least one nickel layer may be produced in an external electroless manner in the performance of step b). Alternatively, the at least one nickel layer may be produced electrolytically in the performance of step b).

With regard to further features and advantages of the method, reference is made completely to the features and advantages described in the second and third aspect of the invention, which are applicable mutatis mutandis.

In a fifth aspect, the invention relates to a working device, in particular comprising an internal combustion engine, or to an internal combustion engine, especially for a working device, having a mixture formation apparatus according to the first or second aspect of the invention or having a mixture formation apparatus manufactured or manufacturable by a method according to the third or fourth aspect of the invention. The working device may be in the form of a hand-guided, hand-held or motor-driven working device. Further, the working device may be in the form of a processing or working robot, in particular an outdoor and/or autonomous mobile processing or working robot. The working device may, as already mentioned, especially be a motor saw, a cutting grinder, a brush cutter, a hedge shears, a blower, a lawn mower or the like. The internal combustion engine may especially be a two-stroke engine.

With regard to further features and advantages of the working device or internal combustion engine, reference is made completely to the features and advantages described in the description so far, i.e. those described in the first to fourth aspects of the invention, which are applicable mutatis mutandis.

In a sixth aspect, the invention relates to the use of a mixture formation apparatus according to the first or second aspect of the invention for a working device or an internal combustion engine of a working device.

With regard to further features and advantages of the mixture formation apparatus, working device and internal combustion engine, reference is made completely to the features and advantages described in the description so far, i.e. those described in the first to fifth aspects of the invention, which are applicable mutatis mutandis.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
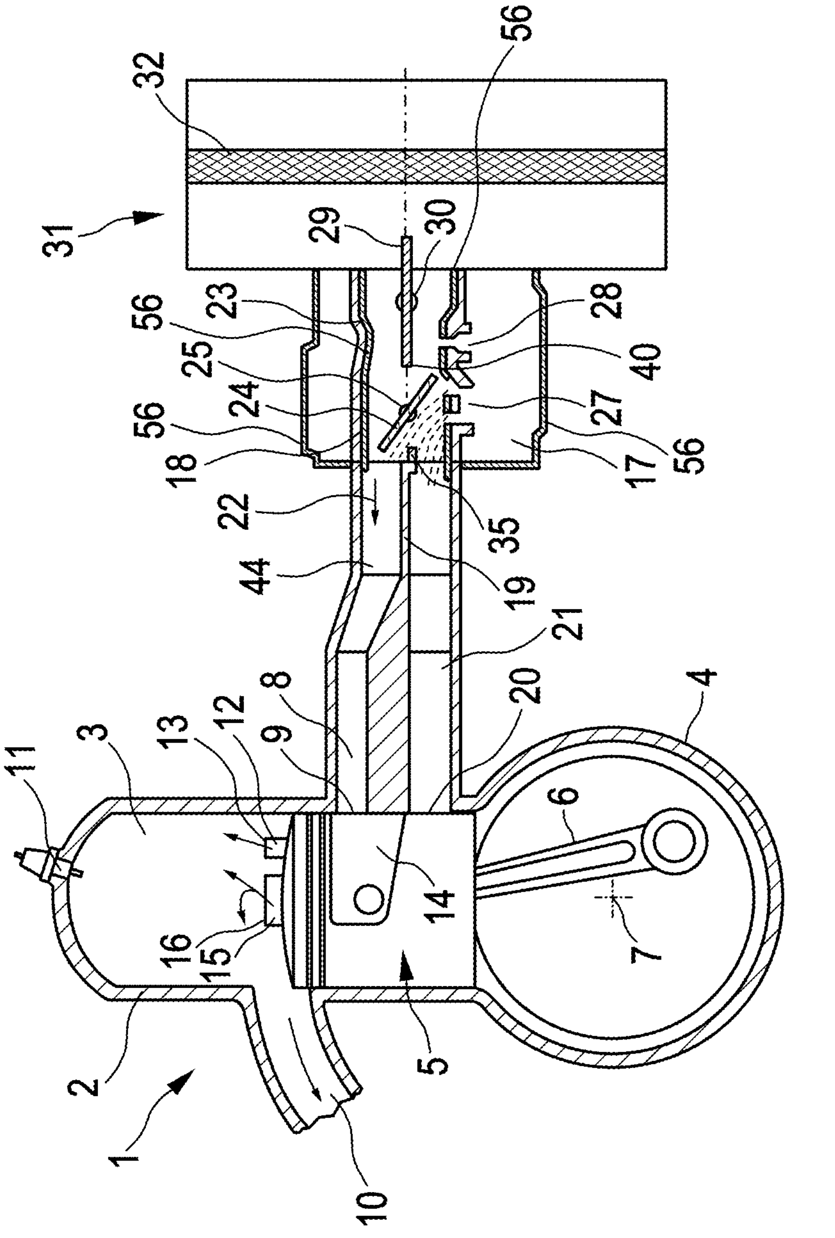
FIG. 1: a schematic diagram of a two-stroke engine with a mixture formation apparatus according to an embodiment of the invention.

FIG. 1 shows a schematic of an internal combustion engine, namely a two-stroke engine 1. The two-stroke engine 1 is designed as a cylinder two-stroke engine. The two-stroke engine 1 serves in particular to drive a tool of a hand-guided or hand-held working device, for example a cutting grinder, a motor saw, a brush cutter or the like. The two-stroke engine 1 has a cylinder 2 in which a combustion chamber 3 is formed. The combustion chamber 3 is bounded by a piston 5 mounted so as to move back and forth within the cylinder 2. The piston 5, via a piston rod 6, drives a crankshaft 7 mounted so as to be rotatable within a crankcase 4.

The two-stroke engine 1 has an intake duct 44. The intake duct 44 is connected via a mixture formation apparatus 17 to an air filter 31. In the air filter 31 is disposed a filter material 32, which filters the combustion air sucked into the intake duct 44. The intake duct 44, in the two-stroke engine 1 shown in FIG. 1, is divided into a mixture duct 21 and a feed duct 8 by a dividing wall 19 downstream of the carburetor 17.

In the case of full-load operation, the feed duct 8 supplies combustion air with a fuel content lower than the fuel content in the mixture duct 21. Advantageously, the combustion air in the feed duct 8 has a low level of fuel or is largely fuel-free. The mixture duct 21 opens out with a mixture inlet 20 in the cylinder 2. The mixture inlet 20 is slot-controlled by the piston 5 and is open to the crankcase 4 in the region of top dead center of the piston 5. The feed duct 8 opens out at a duct inlet 9 in the cylinder 2, which is closed off from the combustion chamber 3 and from the crankcase 4 by the piston 5 in any position of the piston 5.

An outlet 10 for offgases leads out of the combustion chamber 3. A spark plug 11 projects into the combustion chamber 3, which ignites an air-fuel mixture in the combustion chamber 3.

Moreover, the two-stroke engine 14 has transfer ducts 12, 15 in a symmetric arrangement on the cylinder 2 with respect to the section plane in FIG. 1. The two transfer ducts 12 close to the inlet open into the combustion chamber 3 with transfer windows 13. The transfer ducts 15 close to the outlet open into the combustion chamber 3 with transfer windows 16. The piston 5 has at least one piston pocket 14 which, in the region of top dead center of the piston, connects the duct inlet 9 to the transfer windows 13 and 16, such that combustion air can flow out of the feed duct 8 into the transfer ducts 12 to 15.

In an intake duct section 18 formed in the mixture formation apparatus 17, there is a pivotably mounted throttle element, namely a throttle flap 24. The throttle flap 24 is disposed on a throttle shaft 25. The dividing wall 19 projects into the region of the throttle flap 24. The dividing wall 19 has a contact face 35 adjoined by the throttle flap 24 in the fully open position. In the region of the throttle flap 24, secondary fuel openings 27 open into the mixture duct 21.

In the intake duct 44, combustion air flows from the air filter 31 to the two-stroke engine 1 in flow direction 22. In the intake duct section 18, based on the flow direction 22, a choke flap 29 is disposed upstream of the throttle flap 24 and is pivotably mounted with a choke shaft 30. In a region between the choke shaft 30 and the throttle shaft 25, a Venturi 23 is formed in the intake duct section 18, where the flow cross section in the intake duct section is constricted. In the region of the Venturi 23, a main flow opening 28 opens into the mixture duct 21. In flow direction between the choke flap 29 and the throttle flap 24 is disposed a dividing wall section, in the form of a flow-directing element 40.

Figure 2:
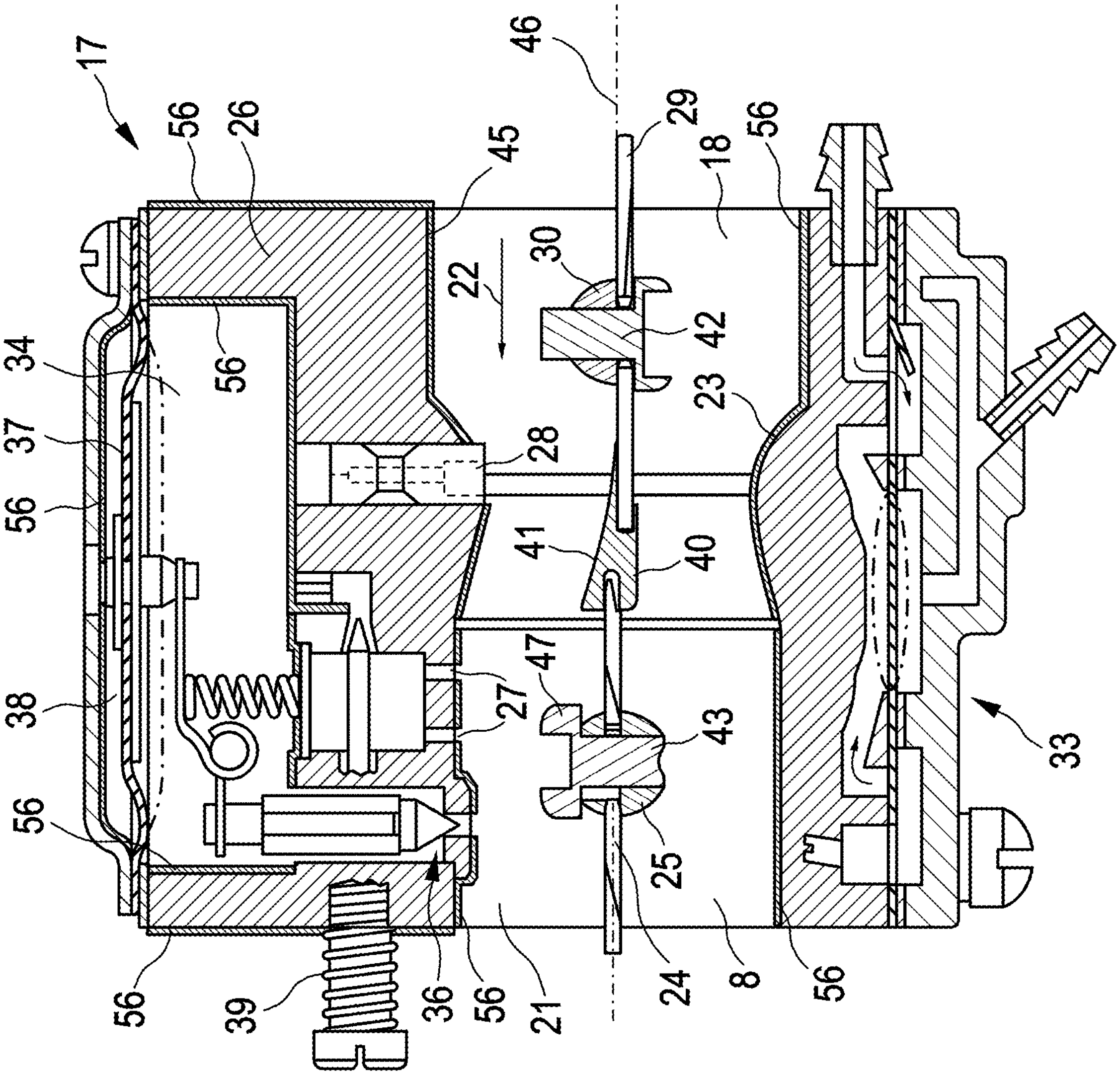
FIG. 2: an enlarged schematic diagram of a mixture formation apparatus in longitudinal section

FIG. 2 shows the mixture formation apparatus 17 in the form of a membrane carburetor in enlarged form. The mixture formation apparatus 17 has a mixture formation apparatus housing 26. The mixture formation apparatus housing 26 preferably includes aluminium or an aluminium alloy, or preferably consists of aluminium or aluminium alloy. A surface, especially an outer surface and/or inner surface, of the mixture formation apparatus housing 26 is or has been provided at least partly, especially only partly, or completely with a layer structure 56 for protection from corrosion and/or deposits, where the layer structure 56 has at least one aluminium oxide layer having a layer thickness of at least 10 μm. Along the at least one aluminium oxide layer, the layer structure 56 preferably has at least one pore-sealing layer, especially at least one nickel acetate layer and/or at least one aluminium hydroxide layer, especially with a layer thickness of ≤5 μm. The at least one aluminium oxide layer may especially be formed here directly on the surface of the mixture formation apparatus housing 26, and the at least one pore-sealing layer especially directly on the at least one aluminium oxide layer, such that the at least one pore-sealing layer forms at least one layer that concludes the layer structure 56 on the outside.

The intake duct section 18 is formed in the mixture formation apparatus housing 26. In particular, an inner surface of the intake duct section 18 may be provided at least partly, especially only partly, or completely with the layer structure 56.

If the throttle flap 24, as shown in FIG. 2, is in its fully open position, the throttle flap 24 separates the intake duct section 18 into the feed duct 8 and the mixture duct 21 in the region of the throttle flap 24. Moreover, an inner surface of the feed duct 8 and/or of the mixture duct 21 may be provided at least partly, especially only partly, or completely with the layer structure 56.

In FIG. 2, the mixture duct 21 is disposed at the top, by contrast with the representation in FIG. 1. The fuel openings 27 and 28 open out in the mixture duct 21, these being fed by a fuel-filled control chamber 34. An inner surface of the control chamber 34 may especially be provided at least partly, especially only partly, or completely with the layer structure 56.

The fuel is sucked into the intake duct 44 from the control chamber 34 via the fuel openings 27, 28 depending on the reduced pressure that exists in the intake duct section 18. The control chamber 34 is separated from a compensation chamber 38 by means of a control membrane 37. The compensation chamber 38 may be connected to the environment or the clean side of the air filter 31. In particular, it is (also) possible to provide an inner surface of the compensation chamber 38 at least partly, especially only partly, or completely with the layer structure 56.

The control membrane 37 actuates an inlet valve 36 via a lever mechanism. Also disposed within the carburetor housing 26 is a fuel pump 33, which conveys fuel to the inlet valve 36 and to the control chamber 34. For adjustment of the amount of fuel supplied to the secondary fuel openings 27, an idling adjuster screw 39 is provided.

The throttle flap 24 is fixed to the throttle shaft 25 by a screw 43. The head 47 of the screw 43 constricts the flow cross section in the mixture duct 21 and constitutes a throttle site. The throttle shaft 25 also projects into the mixture duct 21 and forms a throttle. This can have the effect that the flow in the mixture duct 21, in the fully open position of the throttle flap 24, is more significantly throttled in the region of the throttle shaft 25 than in the region of the Venturi 23. This is undesirable since the greatest throttling and hence the greatest negative pressure is supposed to exist in the region of the Venturi 23 in order to assure sufficient supply of fuel. In flow direction 22 between the choke flap 29 and the throttle flap 24 is disposed a flow-directing element 40 which reduces the throttling generated by the throttle shaft 25 and the head 47 of the screw 43 in the mixture duct 21. For this purpose, the flow-directing element 40 has a flow profile 41 on the side facing the mixture duct 21. It may be the case that a flow profile is formed at the flow-directing element 40 on the side facing the feed duct 8 as well, in order to influence the flow conditions in the intake duct 44. The flow profile 41 is in ramp form and reduces the flow cross section in the mixture duct 21 to an increasing degree in flow direction 22. Viewed in flow direction 22, the flow-directing element 41 increasingly projects into the mixture duct 21. A longitudinal intake duct axis 46 runs parallel to the flow direction 22 in the geometric middle of the flow cross sections of the intake duct 44. The throttle flap 24 is also fixed to the throttle shaft 25 by a screw 42.

It is preferable that especially all non-aluminium-containing or non-aluminium alloy-containing components, especially non-aluminium-containing or non-aluminium alloy-containing insert parts, of the mixture formation apparatus 17 are not provided with the layer structure.

Especially preferably, only the mixture formation apparatus housing 26 is or has been provided with the layer structure.

Figure 3:
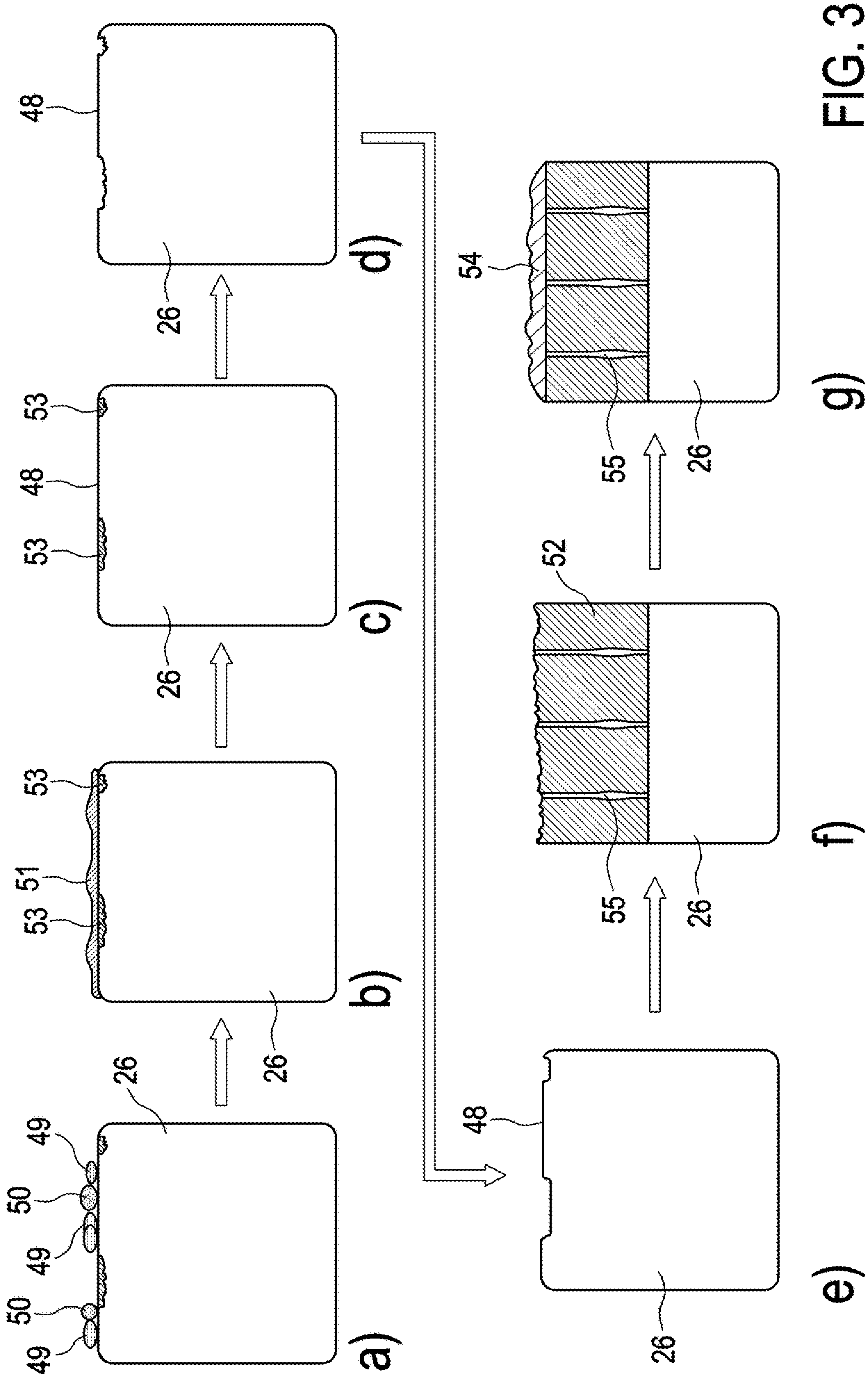
FIG. 3: an embodiment of a method of the invention.

FIG. 3 shows a schematic of an embodiment of a method according to the invention for manufacture of a mixture formation apparatus 17.

The method has a step a):

a) degreasing and/or pickling a surface 48 of a mixture formation apparatus housing 26 (see a,b).

The degreasing and/or pickling can especially remove oil 49 present on the surface 48 of the mixture formation apparatus housing 26. For this purpose, the surface 48 may be treated with an organic, especially halogenated, solvent, especially selected from the group consisting of hydrochlorocarbons, hydrofluorocarbons and mixtures thereof, and/or with an aqueous solution-which is preferable for environmental reasons.

The pickling can advantageously remove particles 50 present on the surface 48 of the mixture formation apparatus housing 26. The surface 48 may especially be treated with the aid of an alkaline solution 51, for example sodium hydroxide solution.

The method also has a step b):

b) at least partly, especially only partly, or completely, i.e. throughout or over the full area, providing the surface 48 of the mixture formation apparatus housing 26 with at least one aluminium oxide layer 52, where the at least one aluminium oxide layer 52 has a layer thickness of at least 10 μm (see f).

An aluminium oxide layer having a layer thickness of at least 10 μm has been found to be particularly advantageous with regard to the formation of a continuous aluminium oxide layer.

Step b) can be conducted immediately after or not immediately after step a).

Preferably, step b) is conducted by anodizing, especially eloxing.

Preferably, step b) is conducted by means of DC current. Alternatively, step b) can be conducted with AC current or with the aid of a combination of both types of current, i.e. DC current and AC current. In the DC current variant, the mixture formation apparatus housing is connected as the anode. The counter electrode used is a material which is not attacked by an electrolyte (which is used for performance of step b)).

Moreover, step b) can be conducted with a voltage of 5 V to 40 V.

Moreover, step b) can be conducted over a period of 20 min to 120 min, especially 30 min to 90 min.

Moreover, step b) can be conducted with an electrolyte, especially selected from the group consisting of sulfuric acid, oxalic acid, and mixtures of at least two of the aforementioned electrolytes.

In particular, step b) can be conducted with a solution, especially an aqueous solution, containing the electrolyte, especially where the electrolyte has a concentration of 150 g/l to 250 g/l, especially 190 g/l to 220 g/l, based on the total weight of the solution.

Moreover, the method may also have, between steps a) and b), a step a'b):

a'b) removing a natural aluminium oxide layer 53 from the surface 48 of the mixture formation apparatus housing 26 (see d).

Step a'b) may especially be conducted by neutralizing the surface 48 of the mixture formation apparatus housing 26 by treatment with an acid, especially inorganic acid, for example sulfuric acid.

Step a'b) can be conducted immediately or not immediately after step a) and/or immediately or not immediately before step b).

Moreover, the method may also have, between steps a) and b), especially between steps a'b) and b), a step ab):

ab) polishing, especially chemically polishing or chemo-mechanically polishing, the surface of the mixture formation apparatus housing 26 (see e).

Step ab) may be conducted immediately or not immediately after step a), especially after step a'b), and/or immediately or not immediately before step b).

Moreover, the method may also have, after, especially immediately or not immediately after, step b), a step c):

c) treating the surface 48 of the mixture formation apparatus housing 26 with a pore-sealing material, especially nickel acetate and/or water, especially water vapour, to form at least one pore-sealing layer 54 (see g).

Step c) can advantageously seal pores 55 in the at least one aluminium oxide layer 52 and hence lower or even completely prevent any risk of corrosion.

In the case of treatment of the surface 48 of the mixture formation apparatus housing 26 with nickel acetate, step c) can be conducted at a temperature of 80° C. to 100° C., especially 85° C. to 95° C., and/or over a period of 5 min to 30 min, especially 10 min to 20 min.

In the case of treatment of the surface 48 of the mixture formation apparatus housing 26 with water, especially water vapour, step c) can be conducted at a temperature of 80° C. to 100° C., especially 85° C. to 95° C., and/or over a period of 5 min to 30 min, especially 10 min to 20 min.

Preferably, step b) is conducted only once, i.e. not repeatedly. This is particularly advantageous for reasons of cost and time.

With regard to further features and advantages of the method, reference is made completely to the features and advantages disclosed in the general description, which are applicable mutatis mutandis.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A mixture formation apparatus, comprising:

a mixture formation apparatus housing; and a layer structure provided at least partly on a surface of the mixture formation apparatus housing for protection from corrosion and/or deposits, wherein the layer structure comprises at least one aluminium oxide layer having a layer thickness of at least 10 μm.

2. The mixture formation apparatus according to claim 1, wherein the at least one aluminium oxide layer has a constant layer thickness and/or a layer thickness of 10 μm to 40 μm.

3. The mixture formation apparatus according to claim 1, wherein the at least one aluminium oxide layer is formed on the surface of the mixture formation apparatus housing.

4. The mixture formation apparatus according to claim 1, wherein the layer structure further comprises at least one pore-sealing layer selected from the group consisting of: at least one nickel acetate layer, at least one aluminium hydroxide layer, and a combination of at least one nickel acetate layer and at least one aluminium hydroxide layer.

5. The mixture formation apparatus according to claim 4, wherein the at least one pore-sealing layer has a layer thickness of ≤5 μm.

6. The mixture formation apparatus according to claim 4, wherein the at least one pore-sealing layer is formed on the at least one aluminium oxide layer and/or as at least one layer that concludes the layer structure exteriorly.

7. The mixture formation apparatus according to claim 1, wherein the surface of the mixture formation apparatus housing is an outer surface, an inner surface or both an outer surface and an inner surface of the mixture formation apparatus housing.

8. The mixture formation apparatus according to claim 1, wherein the surface of the mixture formation apparatus housing has an inner surface that bounds, at least in regions, a hollow volume of the mixture formation apparatus housing.

9. The mixture formation apparatus according to claim 8, wherein the hollow volume of the mixture formation apparatus housing is:

(i) a hollow volume of a duct selected from the group consisting of: an intake duct, a mixture duct, an air feed duct, a fuel feed duct, and combinations thereof, of the mixture formation apparatus housing, and/or (ii) a hollow volume of a control chamber and/or a compensation chamber of the mixture formation apparatus housing.

10. The mixture formation apparatus according to claim 1, wherein the surface of the mixture formation apparatus housing has a surface of an inner wall and/or of a base of at least one depression in the mixture formation apparatus housing, and/or a surface of an inner wall of at least one opening in the mixture formation apparatus housing.

11. The mixture formation apparatus according to claim 10, wherein the at least one depression takes the form of at least one hole and/or the at least one opening takes the form of at least one hole.

12. The mixture formation apparatus according to claim 1, wherein the mixture formation apparatus is a carburetor, and the mixture formation apparatus housing is a carburetor housing.

13. A method of manufacturing a mixture formation apparatus having a mixture formation apparatus housing and a layer structure provided at least partly on a surface of the mixture formation apparatus housing for protection from corrosion and/or deposits, the method comprising the steps of:

a) degreasing and/or pickling the surface of the mixture formation apparatus housing; and b) subsequently, at least partly providing the surface of the mixture formation apparatus housing with the layer structure comprising at least one aluminium oxide layer having a layer thickness of at least 10 μm.

14. The method according to claim 13, wherein step b) is conducted by anodizing.

15. The method according to claim 13, wherein step b) is conducted by eloxing.

16. The method according to claim 13, wherein the method further comprises, after step b), the step of:

c) treating the surface of the mixture formation apparatus housing with a pore-sealing material, namely nickel acetate and/or water, to form at least one pore-sealing layer.

17. The method according to claim 13, wherein step b) is conducted only once.

18. An apparatus, comprising:

a mixture formation apparatus according to claim 1; and a working device or an internal combustion engine having the mixture formation apparatus.

19. The apparatus according to claim 18, wherein the working device is a hand-guided, hand-held or motor-driven working device.

20. The apparatus according to claim 18, wherein the working device is an outdoor and/or autonomous mobile processing robot, a motor saw, a cutting grinder, a brush cutter, a hedge shears, a blower or a lawn mower.

* * * * *